US008707299B1

United States Patent
Bezbaruah et al.

(10) Patent No.: US 8,707,299 B1
(45) Date of Patent: Apr. 22, 2014

(54) METHOD AND APPARATUS FOR PRESERVING VIRTUAL DESKTOPS FOR E-DISCOVERY THROUGH AN AGENT-LESS SOLUTION

(75) Inventors: Angshuman Bezbaruah, Pune (IN); Chirag Dalal, Mumbai (IN)

(73) Assignee: Symantec Corporation, Mountain View, CA (US)

( * ) Notice: Subject to any disclaimer, the term of this patent is extended or adjusted under 35 U.S.C. 154(b) by 1266 days.

(21) Appl. No.: 12/271,403

(22) Filed: Nov. 14, 2008

(51) Int. Cl.
*G06F 9/455* (2006.01)

(52) U.S. Cl.
USPC .................................................. 718/1

(58) Field of Classification Search
USPC .................................................. 712/1; 718/1
See application file for complete search history.

(56) References Cited

U.S. PATENT DOCUMENTS

| | | | | |
|---|---|---|---|---|
| 6,993,761 B1 * | 1/2006 | Czajkowski et al. | ......... | 718/100 |
| 7,769,720 B2 * | 8/2010 | Armington | ................... | 707/654 |
| 8,011,010 B2 * | 8/2011 | Michael et al. | ................. | 726/24 |
| 8,032,351 B2 * | 10/2011 | Stringham | ...................... | 703/21 |
| 2007/0244938 A1 * | 10/2007 | Michael et al. | ............... | 707/204 |
| 2008/0155169 A1 * | 6/2008 | Hiltgen et al. | .................... | 711/6 |
| 2008/0201414 A1 * | 8/2008 | Amir Husain et al. | ....... | 709/203 |
| 2008/0201455 A1 * | 8/2008 | Husain | ......................... | 709/220 |
| 2008/0201479 A1 * | 8/2008 | Husain et al. | ................. | 709/227 |
| 2008/0263658 A1 * | 10/2008 | Michael et al. | ................. | 726/22 |
| 2009/0125902 A1 * | 5/2009 | Ghosh et al. | ...................... | 718/1 |
| 2009/0210427 A1 * | 8/2009 | Eidler et al. | .................... | 707/10 |
| 2009/0216975 A1 * | 8/2009 | Halperin et al. | .............. | 711/162 |

* cited by examiner

*Primary Examiner* — Aimee Li

(74) *Attorney, Agent, or Firm* — Campbell Stephenson LLP

(57) ABSTRACT

A method and apparatus for preserving virtual desktops for e-discovery using an agent-less solution is provided. In one embodiment, the method for providing an agent-less solution to prevent at least one virtual desktop from expiration comprises processing a directory to identify at least one virtual machine used by at least one data custodian as at least one virtual desktop and automatically communicating at least one snapshot of the at least one virtual machine to preserve the at least one virtual desktop.

14 Claims, 3 Drawing Sheets

METHOD AND APPARATUS FOR PRESERVING VIRTUAL DESKTOPS FOR E-DISCOVERY THROUGH AN AGENT-LESS SOLUTION

BACKGROUND

1. Field of the Invention

Embodiments of the present invention generally relate to e-discovery and virtualization techniques and, more particularly, to a method and apparatus for preserving virtual desktops for e-discovery through an agent-less solution.

2. Description of the Related Art

Typically, large to mid-sized organizations maintain volumes of data of Electronically Stored Information (ESI), such as confidential and/or privileged data. For example, such organizations may store financial information (e.g., SEC reports), legal information (e.g., corporate compliance, intellectual property, pending litigations and/or the like), as well as internal documents (e.g., health records, employee information and/or the like). Such data may be archived and stored in the repository for later use by various archival software products (e.g., SYMANTEC Enterprise Vault). Afterwards, such data may expire and become unavailable. For example, documents (e.g., a deposition, an affidavit and/or the like) created during a previous legal matter (e.g., litigation, mediation and/or the like) are deleted and thus cannot be used in any pending legal matter. As such, the organization desires to preserve the confidential and/or privileged data relevant for future purposes.

A legal hold (e.g., litigation hold and/or the like) may be a process that preserves numerous forms of the ESI in anticipation of litigation. For example, the various archival software products may support such a legal hold in order to prevent confidential and/or privileged data in the archives from expiration for a certain number of users. However, legal holds are difficult to enforce and control for confidential and/or privileged data that resides within a custodian computer (e.g., a desktop or a laptop) that contains large volumes of the ESI. Legal holds are easier to implement in archives (and backups) since the archived data resides in a central location that is directly under control of the Information Technology (IT) department. Whereas, custodian computers contain ESI in a decentralized form that renders legal holds very difficult to implement. Conventional legal hold solutions on custodian computers require agents (i.e., software programs) to be installed to lock down the archived data in the event of a pending litigation.

Hence, due to the rapid proliferation of virtualization technologies (e.g., VMWARE Virtual Desktop Infrastructure (VDI)), implementing legal holds of virtual desktops is important for many organizations. Conventional agent-based solutions for creating legal holds on the confidential and/or privileged information within the custodian computers may be applied to the virtual desktops in a same or similar manner. Such agent-based solutions are not optimized for virtual desktops. Since the virtual desktops are actually virtual machines running in centralized servers, legal holds may be performed on the virtual desktops using more efficient, agent-less solutions as compared to physical machines. Also advanced virtual machine features (e.g., snapshots) may be utilized to perform legal holds on the virtual desktops in a non-intrusive manner.

Therefore, there is a need in the art for a method and apparatus for preserving virtual desktops for e-discovery using an agent-less solution.

SUMMARY OF THE INVENTION

Embodiments of the present invention generally comprise a method and apparatus for preserving virtual desktops for e-discovery using an agent-less solution. In one embodiment, the method for providing an agent-less solution to prevent at least one desktop from expiration comprises processing a directory to identify at least one virtual machine used by at least one data custodian as at least one virtual desktop and automatically communicating at least one snapshot of the at least one virtual machine to preserve the at least one virtual desktop.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
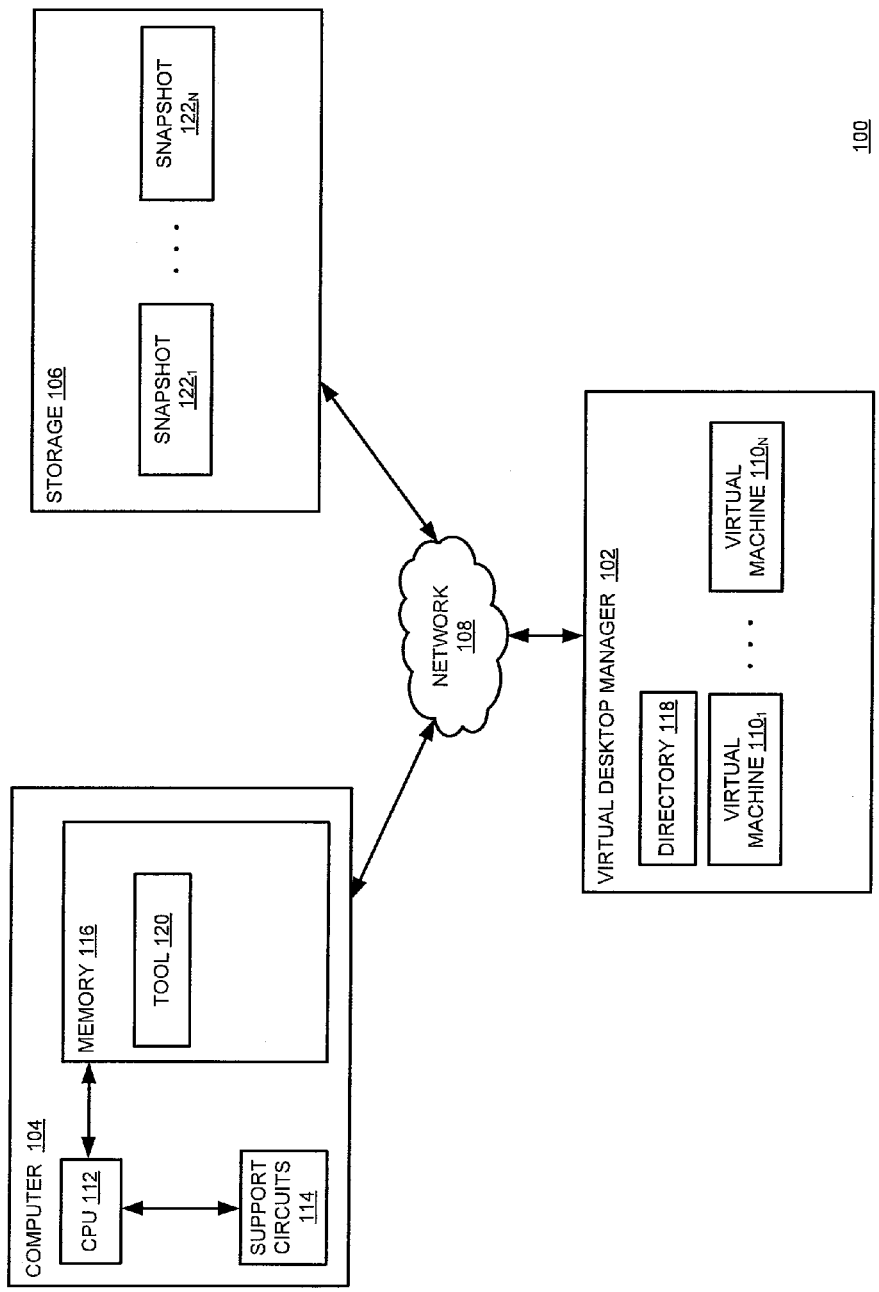
FIG. 1 is a block diagram of a system for preserving virtual desktops for e-discovery through an agent-less solution, according to one or more embodiments of the present invention.

FIG. 1 is a block diagram of a system 100 for preserving one or more virtual desktops for e-discovery through an agent-less solution according to one or more embodiments of the present invention. For example, a custodian (e.g., a user) at a remote location may be provided with a virtual desktop from a centralized computing environment. From such a remote location, the custodian may interact with the virtual desktop in substantially the same manner as a desktop of a physical machine that is located at the centralized computing environment. In one embodiment, the system 100 comprises a virtual desktop manager 102, a computer 104 and storage 106 where each is coupled to each other through a network 108.

The computer 104 is a type of computing device (e.g., a laptop, a desktop, a Personal Digital Assistant (PDA) and/or the like), such as those generally known in the art. The computer 104 includes a Central Processing Unit (CPU) 112, various support circuits 114 and a memory 116. The CPU 112 may comprise one or more commercially available microprocessors or microcontrollers that facilitate data processing and storage. The support circuits 114 facilitate the operation of the CPU 112 and include one or more clock circuits, power supplies, cache, input/output circuits, and the like. The memory 116 comprises at least one of Read Only Memory (ROM), Random Access Memory (RAM), disk drive storage, optical storage, removable storage, and the like. The memory 116 includes various software packages, such as a tool 120.

The storage 106 generally includes various components (i.e., hardware and software) that are configured to manage storage resources within a computing environment. The storage 106 includes one or more data storage devices (e.g., hard disk drives, optical drives, magnetic tape drives and/or the like) and storage management software that provides an interface (e.g., Integrated Drive Electronics/AT Attachment (IDE/ ATA), Small Computer Systems Interface (SCSI) and/or the like) to the one or more data storage devices for the client 102. The storage 106 facilitates permanent storage (i.e., backup) of critical computer data, such as one or more snapshots 122.

The virtual desktop manager 102 securely manages and provides access to one or more virtual desktops for one or more custodians. The virtual desktop manager 102 includes one or more virtual machines 110 (illustrated as a virtual machine $110_1$ ... a virtual machine $110_N$) and a directory 118. In general, the virtual machines 110 access physical computing resources at the virtual desktop manager through an abstraction/virtualization layer that is produced by virtualization software. Moreover, the virtual machines 110 represent one or more physical machines, which may be remotely operated by the one or more custodians as the one or more virtual desktops. According to various embodiments of the present invention, the directory 118 includes a mapping between each custodian in the centralized computing environment and one or more virtual machines that provide a corresponding virtual desktop. For example, the directory 118 may include a mapping between an employee name/identifier and a particular virtual machine that creates the corresponding virtual desktop. Furthermore, the one or more custodians interact with the virtual machines 110 through various remote display protocols or terminal services (e.g., MICROSOFT Remote Desktop/Terminal Services, CITRIX Independent Computing Architecture and/or the like).

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like. Furthermore, the network 108 may form a portion of a Storage Network Area (SAN) using various communications infrastructure such as Ethernet, Fibre Channel, InfiniBand and/or the like.

In one or more embodiments, the tool 120 may be an e-discovery tool (e.g., case management tools, review tools, litigation tools and/or the like) that facilitates search and analysis (e.g., forensic analysis) of data, such as case management tools, review tools, email archive tool, analytical tools and the like. In one or more embodiments, the tool 120 may support a legal hold operation that specifies one or more custodians. In one embodiment, the tool 120 specifies an expiration period. According to various embodiments of the present invention, the tool 120 determines which virtual machine of the virtual machines 110 is utilized as a virtual desktop by a particular custodian using mappings provided by the directory 118. According to various embodiments of the present invention, the tool 120 cooperates with the virtual desktop manager 102 to generate the snapshots 122 of the virtual machines 110. In one embodiment, the tool 120 invokes one or more virtual desktop manager interface functions to generate the snapshots 122. For example, the one or more virtual desktop manager interface functions may include one or more commands exported by the virtual desktop manager 102, such as a command for generating a snapshot. In addition, the virtual desktop manager 102 exports an Application Programming Interface formed by the one or more virtual desktop manager interface functions.

According to various embodiments of the present invention, the snapshots 122 are image files that encapsulate data and resources of the virtual machines 110. As such, each snapshot of the snapshots 122 represents a virtual machine of the virtual machines 110. In one or more embodiments, the snapshot 122 represents a copy of working environment of the virtual machines 110. In one or more embodiments, the snapshots 122 may be mounted at a later data for e-discovery and analysis.

As an example and not as a limitation, the tool 120 (e.g., an e-discovery tool associated with SYMANTEC Enterprise Vault) is configured to prevent expiration of data (e.g., confidential and/or privileged data for legal matters) within a particular virtual machine to preserve a virtual desktop. In one embodiment, the tool 120 is designed to identify one or more custodians that utilize the one or more desktops. The custodian controls the virtual desktop and operates the data that may be preserved by the tool 120. In one embodiment, the tool 120 generates and initiates a Lightweight Directory Access Protocol (LDAP) query to identify the one or more virtual machines utilized as the desktop by the one or more custodians. According to various embodiments of the present invention, the tool 120 processes the directory 118 to provide a mapping between the one or more custodians and the one or more virtual machines 110. For example, VMWARE Virtual Desktop Infrastructure (VDI) integrates with MICROSOFT Active Directory to determine and maintain such mappings. Alternatively, the tool 120 may invoke one or more Application Programming Interface (API) functions exported by the virtual desktop manager 102 that, in turn performs the LDAP query to satisfy a request in the API call. Optionally, the tool 120 specifies a time range for selecting data for preservation through a legal hold.

Once the virtual machine that provides the virtual desktop used by the custodian is identified, the tool 120 invokes an API function (e.g., exported by a Virtual Infrastructure Management product (VMWARE Virtual Center)) to generate the snapshot 122 of the one or more virtual machines 110. In another embodiment, the computer 104 may include an installation of a VDI client (e.g., software code that operates with the centralized virtual desktop environment) that may be utilized to generate a snapshot at the virtual desktop manager 102. According to various embodiments of the present invention, the tool 120 transports (i.e., copies) the snapshots 122 to the storage 106 for secure storage. In one embodiment, the tool securely copies the snapshots 122 to the storage 106 through the network 108 (e.g., a Local Area Network (LAN), a Wide Area Network (WAN), a Storage Area Network (SAN) and/or the like).

Subsequently, the snapshots 122 may be mounted for e-discovery. In one embodiment, the snapshots 122 are utilized for forensic analysis, which is performed by various e-discovery tools. If the user has accidentally and/or maliciously deleted data blocks and/or whole files that may contain privileged and/or confidential data, then the tool examines one or more free blocks or file segments to determine the deleted data blocks and/or files. In one embodiment, files within the snapshots 122 are scanned for content. In one embodiment, the analysis tools indexes the content to segregate various information (e.g., corporate data and personal data). As such, the analysis tools are able to extract various portion of the content for review. Alternatively, complete copies of the snapshots 122 may be preserved without segregating the various information.

Figure 2:
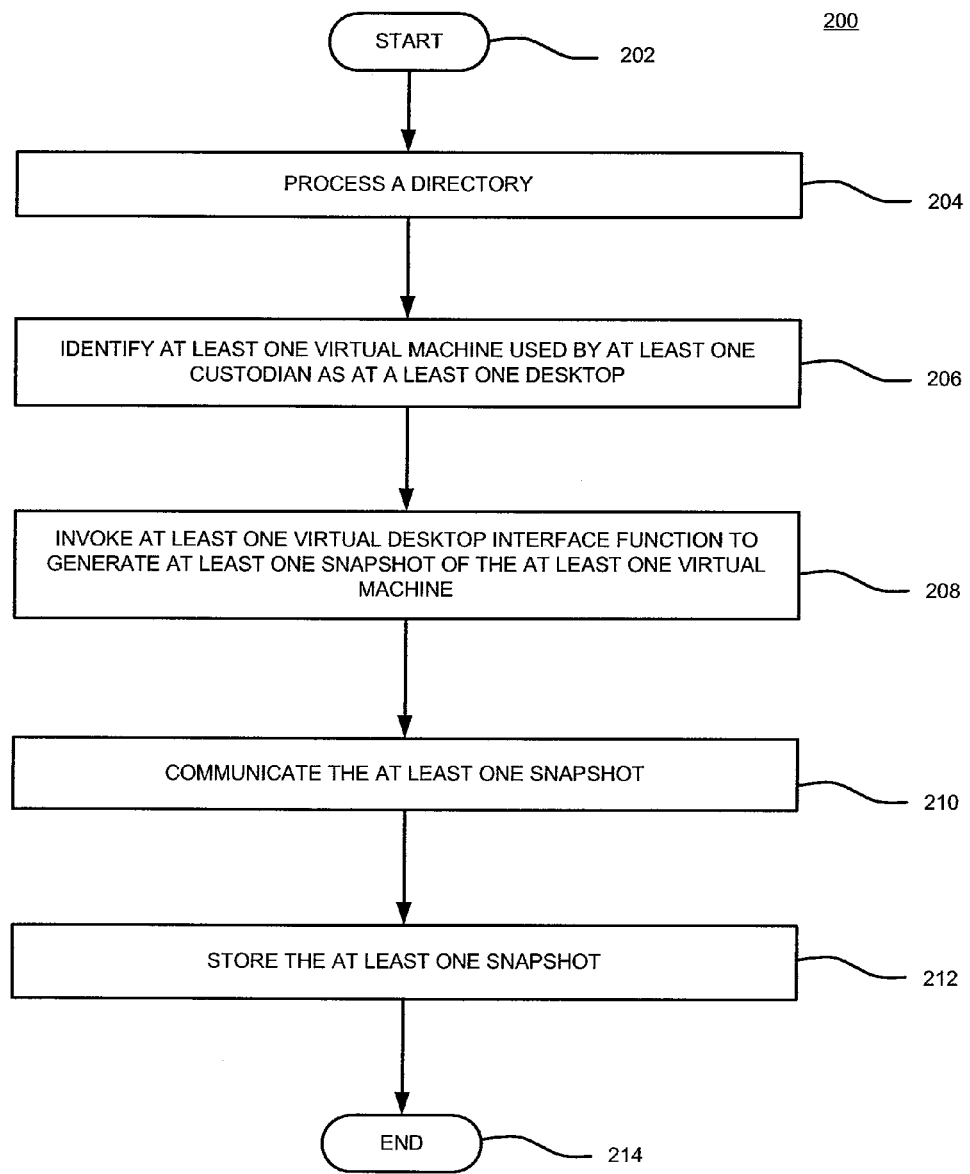
FIG. 2 is a flow diagram of a method for preserving virtual desktops for e-discovery through an agent-less solution, according to one or more embodiments of the present invention.

FIG. 2 is a flow diagram of a method 200 for preserving virtual desktops for e-discovery through an agent-less solution according to one embodiment. The method 200 starts at step 202 and proceeds to step 204, at which a directory (e.g., the directory 118 of FIG. 1) is processed.

In one or more embodiments, the directory provides a mapping between a custodian name/identifier and one or more virtual machines (e.g., the virtual machines 110 of FIG. 1). At step 206, the one or more virtual machines utilized by the one or more custodians as one or more virtual desktops are identified. At step 208, one or more virtual desktop interface function is invoked to generate one or more snapshots (e.g., the snapshots 122 of FIG. 1) of the one or more virtual machines. At step 210, the one or more snapshots are communicated (e.g., transported or copied). At step 212, the one or more snapshots are stored. For example, the one or more snapshots may be copied to secure storage devices (e.g., the storage 106 of FIG. 1) through a secure computer network (e.g., the network 108 of FIG. 1). The method 200 proceeds to step 214, where the method 200 ends.

Figure 3:
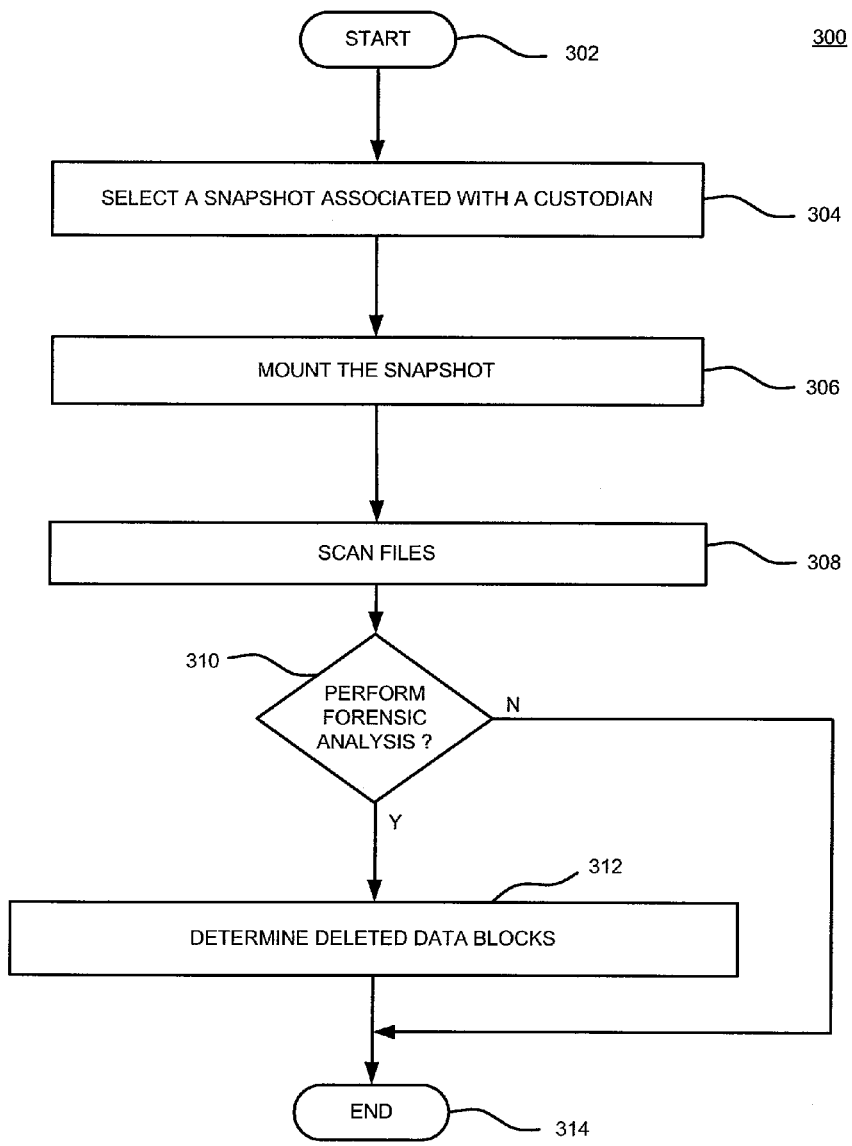
FIG. 3 is a flow diagram of a method for analyzing snapshots associated with a custodian, according to one or more embodiments of the present invention.

FIG. 3 is a flow diagram of a method 300 for performing forensic analysis on snapshots according to one embodiment. The method 300 starts at step 302 and proceeds to step 304, at which a snapshot (e.g., a snapshot of the snapshots 122 of FIG. 1) associated with a custodian (e.g., a user) is selected.

At step 306, the snapshot is mounted. In one embodiment, the snapshot is mounted in order to perform a forensic and/or a non-forensic analysis. At step 308, one or more files are scanned. At step 310, a determination is made as to whether a forensic analysis is to be performed on the mounted snapshot. If it is determined that the forensic analysis is to be performed (option "YES") then the method 300 proceeds to step 312. At step 312, one or more deleted data blocks are determined. In one embodiment, the deleted data blocks may have been accidentally and/or maliciously deleted. In one or more embodiments, free blocks and/or file segments are examined in order to determine the deleted data blocks. The method 300 proceeds to step 314. If at step 308, it is determined that forensic analysis is not to be performed (option "NO") then the method 300 proceeds to step 314. The method 300 ends at step 314.

Thus, various embodiments of the present invention have been provided. The inventive methods and apparatus may advantageously preserve virtual desktops for e-discovery using an agent-less solution since agents are not required to be installed. In one embodiment, the inventive apparatus advantageously optimizes legal hold process.

While the foregoing is directed to embodiments of the present invention, other and further embodiments of the invention may be devised without departing from the basic scope thereof, and the scope thereof is determined by the claims that follow.

The invention claimed is:

1. A method, comprising:
   generating a query, wherein
      the query comprises information identifying a custodian associated with a legal hold, and
   specifying an expiration period associated with the legal hold;
   identifying a virtual machine based on the virtual machine being used by the custodian, in response to the generating the query, wherein
      the identifying comprises searching a directory for a mapping corresponding to the custodian, and
      the custodian remotely operates the virtual machine as a virtual desktop controlled by the custodian;
   causing a virtual desktop manager to generate a snapshot of data of the virtual machine and resources of the virtual machine, in response to the identifying, and
   initiating storage of the snapshot generated by the virtual desktop manager in a storage device not controlled by the custodian, wherein
      the generating, the specifying, the identifying, the causing, and the initiating are performed by a tool configured to prevent expiration of data subject to the legal hold prior to an end of the specified expiration period.

2. The method of claim 1, further comprising:
   specifying a time period, wherein
      data within the virtual machine during the time period is preserved by virtue of being included in the snapshot.

3. The method of claim 1, wherein the causing comprises invoking at least one virtual desktop manager interface function by a command exported by the virtual desktop manager.

4. The method of claim 1 further comprising performing a forensic analysis of the snapshot.

5. The method of claim 4, wherein performing the forensic analysis further comprises identifying at least one deleted data block.

6. The method of claim 1 further comprising scanning files within the snapshot.

7. An apparatus, comprising a computer readable storage medium storing program instructions executable by a processor to:
   generate a query, wherein
      the query comprises information identifying a custodian associated with a legal hold, and
   specify an expiration period associated with the legal hold;
   identify a virtual machine based on the virtual machine being used by the custodian, in response to the generating the query, wherein
      identification of the virtual machine involves searching a directory for a mapping corresponding to the custodian, and
      the custodian remotely operates the virtual machine as a virtual desktop controlled by the custodian;
   cause a virtual desktop manager to generate a snapshot of data of the virtual machine and resources of the virtual machine, in response to the identification of the virtual machine, and
   initiate storage of the snapshot generated by the virtual desktop manager in a storage device not controlled by the custodian in order to prevent expiration of data subject to the legal hold.

8. The apparatus of claim 7, further comprising:
   specifying a time period, wherein
      data within at least one virtual machine during the time period is preserved by virtue of being included in the snapshot.

9. The apparatus of claim 7, wherein the program instructions are executable to cause the snapshot to be generated by invoking a virtual desktop manager interface function.

10. The apparatus of claim 7 wherein the wherein the program instructions are executable to perform a forensic analysis of the snapshot.

11. The apparatus of claim 10, wherein the wherein the program instructions are executable to identify at least one deleted data block.

12. The apparatus of claim 7, wherein the wherein the program instructions are executable to scan files within the snapshot.

13. A system, comprising:
a virtual desktop manager comprising a directory mapping a plurality of custodians to a plurality of virtual machines; and
a computing device implementing a tool configured to:
generate a query, wherein
the query comprises information identifying a custodian associated with a legal hold, and
specify an expiration period associated with the legal hold;
identify a virtual machine based on the virtual machine being used by the custodian, in response to the generating the query, wherein
identification of the virtual machine involves searching the directory for a mapping corresponding to the custodian, and
the custodian remotely operates the virtual machine as a virtual desktop controlled by the custodian;
cause a virtual desktop manager to generate a snapshot of data of the virtual machine and resources of the virtual machine, in response to the identification of the virtual machine, and
initiate storage of the snapshot generated by the virtual desktop manager in a storage device not controlled by the custodian in order to prevent expiration of data subject to the legal hold.

14. The system of claim 13, wherein the tool is configured to perform a forensic analysis of the snapshot.

\* \* \* \* \*